United States Patent [19]

Takahashi

[11] 4,277,130
[45] Jul. 7, 1981

[54] ZOOM STEREOMICROSCOPE WITH TAKING LENS BARREL

[75] Inventor: Naoyuki Takahashi, Hino, Japan

[73] Assignee: Olympus Optical Co., Ltd., Tokyo, Japan

[21] Appl. No.: 7,552

[22] Filed: Jan. 29, 1979

[30] Foreign Application Priority Data

Feb. 18, 1978 [JP] Japan .................................. 53-17131

[51] Int. Cl.³ ............................................ G02B 21/22
[52] U.S. Cl. ....................................... 350/36; 350/42; 350/44
[58] Field of Search ...................... 350/19, 32, 36, 42, 350/44

[56] References Cited

U.S. PATENT DOCUMENTS

| 2,933,026 | 4/1960 | Winzenberg | 350/19 X |
| 3,502,392 | 3/1970 | Muller | 350/184 |
| 3,503,675 | 3/1970 | Muller | 350/184 |
| 3,510,202 | 5/1970 | Boughton | 350/187 |
| 4,232,933 | 11/1980 | Nakahashi | 350/40 X |

Primary Examiner—John K. Corbin
Assistant Examiner—Matthew W. Koren
Attorney, Agent, or Firm—Weinstein & Sutton

[57] ABSTRACT

A zoom stereomicroscope with taking lens barrel comprises a binocular observation stereomicroscope, formed by a pair of observation optical subsystems, and an auxiliary optical subsystem which may be used for purpose of photographing or auxiliary observation. The auxiliary subsystem is focussed in the same manner as the observation subsystems. Each optical subsystem includes a zooming movable lens. The movable lenses are connected with associated drive members which are driven in unitary fashion to change the magnification in the respective subsystems simultaneously.

8 Claims, 1 Drawing Figure

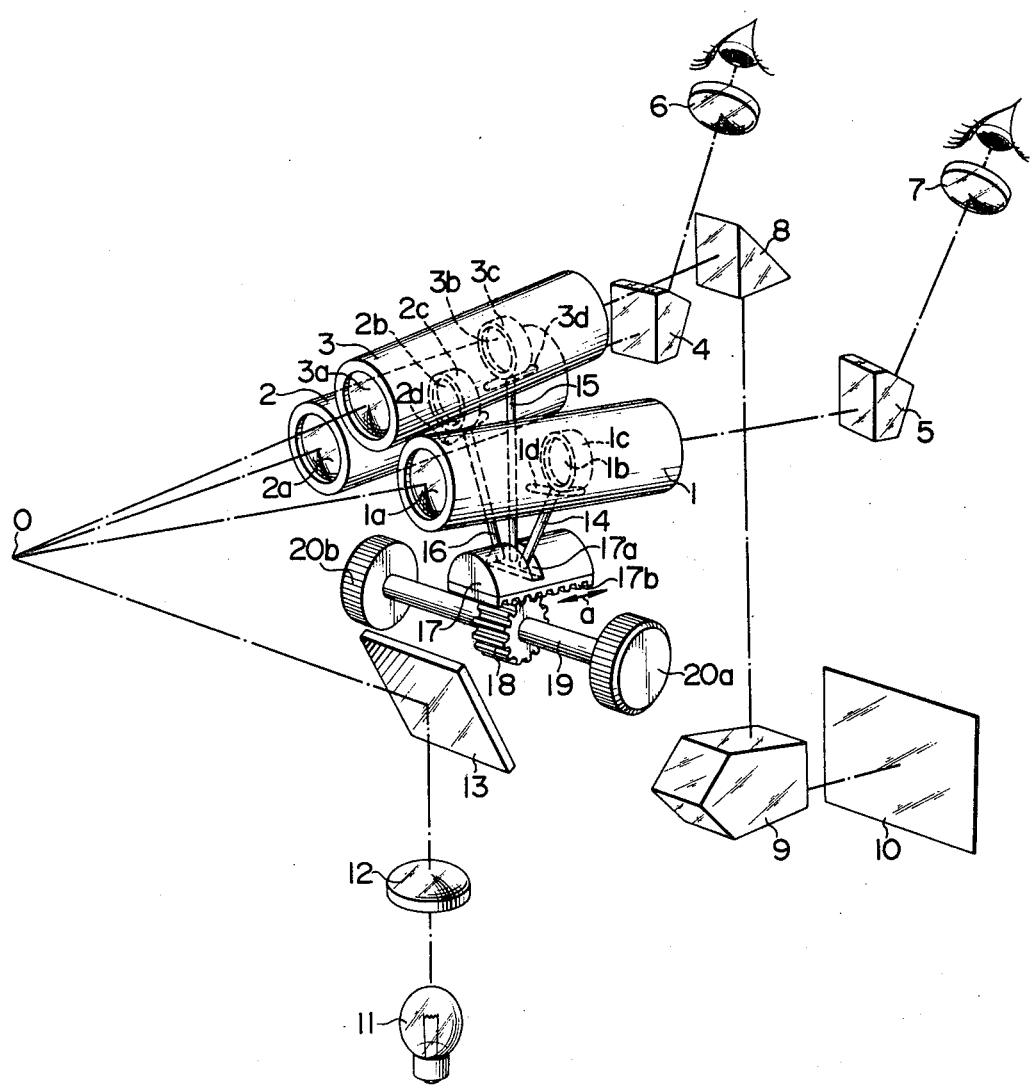

ZOOM STEREOMICROSCOPE WITH TAKING LENS BARREL

BACKGROUND OF THE INVENTION

The invention relates to a zoom stereomicroscope with taking lens barrel, and more particularly, to such a microscope comprising a binocular observation zoom stereomicroscope combined with a photographing or auxiliary observation optical system in which each optical subsystem has a variable magnification for zoom use.

A variety of zoom stereomicroscopes are available which are provided with a photographing or auxiliary observation optical subsystem. However, conventional arrangements suffer from certain drawbacks. Specifically, if it is desired to change the magnification when taking a picture, it is necessary to change the objective lens in a microscope of the type employing objective lenses of different magnifications, resulting in inconvenience in operation. This also results in the inability to provide a continuously changing magnification. With a microscope including a half mirror which diverts part of the light from an observation optical subsystem into a branch path for photographing or auxiliary observation purpose, there results a loss of the amount of light available and also difficulty in operating because of an increased length of the lens barrel. A continuous variation of the magnification is also impossible in a microscope comprising a binocular observation optical subsystem and a separate photographing optical subsystem each including an auxiliary lens which may be simultaneously inserted, removed or replaced by other auxiliary lenses to enable a variable magnification of the both optical subsystems in one operation.

SUMMARY OF THE INVENTION

It is an object of the invention to provide a zoom stereomicroscope with taking lens barrel capable of providing a continuously changing magnification, by providing a zooming subsystem in each binocular observation optical subsystem and a photographing or auxiliary observation optical subsystem and connecting the movable lenses in respective zooming subsystems together for unitary movement.

In accordance with the invention, a binocular observation optical subsystem and a photographing or auxiliary observation optical subsystem each include a zooming optical subsystem having a movable lens. The movable lenses are moved in unitary fashion as an operating knob is turned. Thus, it is unnecessary to replace objective lenses or auxiliary lenses each time a different magnification is desired. In addition, the magnification can be continuously changed. The photographing or auxiliary observation optical subsystem is independent from the binocular observation optical subsystem, and hence does not suffer from a reduced amount of light available.

Apparatus is provided for moving the movable lenses of the individual zooming optical subsystems in unitary fashion, and comprise a plurality of drive members secured to the holding frame of each associated movable lens, a rack operatively connected with the individual drive members, and a pinion disposed in meshing engagement with the rack. Because of this simplified mechanism, it can be constructed in a compact manner, avoiding an increased overall size of the microscope. The mechanism may be disposed intermediate the lens barrels of the binocular optical subsystem to minimize the size of the microscope.

BRIEF DESCRIPTION OF THE DRAWING

The single drawing is a perspective view of a zoom stereomicroscope according to the invention.

DESCRIPTION OF PREFERRED EMBODIMENT

Referring to the drawing, there are shown a pair of lens barrels 1, 2 which are used for a binocular vision or observation. The lens barrels 1, 2 are spaced apart in a horizontal plane and form an angle therebetween so that their respective optical subsystems are focussed at an object O to be examined. The individual lens barrels 1, 2 contain an observation optical subsystem which comprises an objective lens 1a or 2a and a zooming optical subsystem. The zooming subsystem includes a movable lens 1b or 2b which is in turn supported by a holding frame 1c or 2c so as to be capable of being moved forwardly or rearwardly in the direction of the associated optical axis in order to provide a continuously changing magnification.

A pair of observation prisms 4, 5 are spaced rearwardly of the respective lens barrels 1, 2 in alignment with the optical axes thereof, and refract the reflected light from the object O passing through the observation subsystems into paths which extend obliquely upward and on which a pair of eyepieces 6, 7 are disposed to permit a binocular vision.

An auxiliary lens barrel 3 is disposed above and intermediate the lens barrels 1, 2 and contains a photographing or auxiliary observation optical subsystem which is focussed in the same manner as the observation optical subsystems. The optical subsystem contained in the lens barrel 3 is constructed in the same manner as the observation optical subsystems, including an objective lens 3a and a zooming subsystem. The zooming subsystem includes a movable lens 3b which is supported by a holding frame 3c so as to be capable of moving forwardly and rearwardly in the direction of its optical axis in order to provide a continuously changing magnification. An optical path diverting prism 8 is spaced rearwardly from the auxiliary lens barrel 3 and refracts the reflected light from the object O passing through the optical subsystem contained therein to a downwardly extending path which is substantially at right angles to the path of incidence. The downwardly extending path is further refracted rearwardly by another prism 9 to expose a photographic film 10, for example.

The object O to be examined is illuminated by an illumination optical subsystem comprising a lamp 11, condenser lens 12 and reflecting mirror 13.

The bottom of each lens barrel 1, 2, 3 is formed with an elongate slot 1d, 2d, 3d in a region corresponding to the associated lens frame 1c, 2c, 3c. Drive members 14, 15, 16 extend through these slots into the respective lens barrels 1, 2, 3 and have their one end connected with the associated frames 1c, 2c, 3c. The other end of the drive members 14 to 16 is tightly fitted into a slot 17a formed in a rack 17. The rack 17 is semi-cylindrical in configuration, and its lower horizontal bottom surface is formed with teeth 17b which mesh with a pinion 18. Hence, as the pinion 18 rotates, the rack can be moved in a direction indicated by an arrow a. It is to be noted that the slot 17a is formed in the upper, semi-cylindrical surface of the rack 17 intermediate its length and extends in a direction perpendicular to the direction of movement of the rack.

It is to be noted that the drive member 15 which is connected with the movable lens 3b contained in the auxiliary lens barrel 3 is fitted into the slot 17a in the central region thereof while the drive members 14, 16 connected with the movable lenses 1b, 2b contained in the both observation lens barrels 1, 2 are fitted therein on the opposite sides of the drive member 15 in consideration of the fact that the auxiliary lens barrel 3 is inclined vertically to require a vertical displacement of the drive member 15 as it is moved in the direction of the optical axis of the subsystem 3. On the other hand, the lens barrels 1, 2 form an angle therebetween in a horizontal plane, and an allowance for a lateral movement of the drive members 14, 16 are provided by disposing them in the slot 17a on the opposite sides of the drive member 15.

The slot 3d is formed to extend parallel to the optical axis of the lens barrel 3 while the slots 1d, 2d formed in the lens barrels 1, 2, respectively, extend in directions along which the drive members 14, 16 should be moved. As the rack 17 is driven, the both drive members 14, 16 cooperate with the slots 1d, 2d and slot 17a to provide a smooth movement even though the spacing therebetween varies.

The pinion 18 is fixedly mounted on a magnification control shaft 19 which is rotatably mounted on a stationary member (not shown) of the microscope. The opposite ends of the shaft 19 extend externally of the microscope, with magnification controlling knobs 20a, 20b fixedly mounted thereon.

In use, the object O can be observed by placing the both eyes close to the eyepieces 6, 7. In the course of the binocular vision of the object O, the knobs 20a, 20b may be turned to change the magnification. As either knob is turned, the pinion 18 rotates to move the rack 17 in the direction of the arrow a, moving the individual drive members 14, 15, 16 and hence their associated holding frames 1c, 2c, 3c simultaneously, achieving a continuous change of the magnification. In this manner, the object O can be observed at any magnification desired. It should be noted that when a picture of the object is to be taken, a photograph of the object can be obtained at the same magnification as it is viewed.

By utilizing the optical subsystem contained within the lens barrel 3 as well as the prisms 8, 9 as an auxiliary observation subsystem, the object can be displayed at the same magnification as that used in the binocular vision for educational purpose.

In the embodiment described above, film 10 is spaced rearwardly from the path diverting prism 9. However, it should be understood that a camera body may be disposed on top of the microscope and that a prism, reflecting mirror or equivalent means may be used to direct the light from the auxiliary optical subsystem onto a film contained in the camera.

When the microscope is used during a surgical operation, humors may cover the surface of an affected part to cause an unnecessary reflection of light, presenting a difficulty in the observation. To avoid this, a polarizer may be disposed in front of the lamp 11, and respective lens barrels 1, 2, 3.

The optical subsystem contained in the auxiliary lens barrel need not be the same as that contained in the binocular observation subsystems, but may have a different magnification from the latter, the only requirement being that it be focussed at the same point as the observation subsystems.

What is claimed is:

1. A zoom stereomicroscope with taking lens barrel comprising a pair of binocular observation lens barrels each containing an observation optical subsystem including a zooming optical subsystem, an auxiliary lens barrel supporting another optical subsystem including a zooming optical subsystem which is focused in the same manner as the observation subsystems, each of said zooming optical subsystems including a movable lens, a plurality of drive members each extending through the individual lens barrels and connected with a movable lens of the associated zooming subsystem, and drive means for operating the drive members and moving said movable lenses in unitary fashion.

2. A zoom stereomicroscope according to claim 1 in which the drive means comprises a rack for moving the individual drive members in directions of the optical axis of individual optical subsystems, and a pinion disposed in meshing engagement with the rack.

3. A zoom stereomicroscope according to claim 2 in which the rack is formed with a slot extending in a direction perpendicular to the direction of movement of the rack, one end of the individual drive members being fitted in the slot.

4. A zoom stereomicroscope according to claim 1 in which each of the drive members is in the form of a rod having one end extending through a slot formed in its associated lens barrel to be secured with the frame which holds the movable lens of the zooming subsystem contained therein and having its other end fitted in a slot formed in the rack.

5. A zoom stereomicroscope according to claim 1 in which the optical subsystem contained in the auxiliary lens barrel constitutes a photographing optical subsystem or an auxiliary observation optical subsystem.

6. A zoom stereomicroscope comprising a pair of binocular observation lens barrels each containing an observation optical subsystem including a zooming optical subsystem, an auxiliary lens barrel supporting another optical subsystem including a zooming optical subsystem which is focused on the same point as the observation optical subsystems, each of said zooming optical subsystems including a movable lens, a plurality of drive members, each connected with a movable lens of each zooming subsystem, and drive means for operating the drive members to simultaneously move each of said movable lenses to provide a continuous variation in magnification.

7. A zoom stereomicroscope according to claim 6, wherein each of said lens barrels includes a slot formed therein, and wherein each of said drive members extends through an associated slot and is connected to an associated movable lens.

8. A zoom stereomicroscope according to claim 7, wherein the slot formed in said auxiliary lens barrel is disposed parallel to the optical axis of said auxiliary lens barrel and wherein the slot formed in each of said binocular observation lens barrels is disposed at an angle relative to the slot in said auxiliary lens barrel.

* * * * *